United States Patent Office

3,076,713
Patented Feb. 5, 1963

3,076,713
PROCESSING MEAT
Russell H. Maas, Madison, Wis., assignor to Oscar Mayer & Co., Inc., Chicago Ill., a corporation of Illinois
No Drawing. Filed July 3, 1961, Ser. No. 121,314
13 Claims. (Cl. 99—107)

This invention relates, generally, to innovations and improvements in the processing of meat in which pieces, cuts or chunks of uncooked whole, unground, meat either fresh or cured, are subjected to some form of mechanical working whereby such pieces, cuts or chunks become temporarily soft and pliable and a creamy, tacky exudate forms on the surface of the meat, and advantage is taken of the presence of such an exudate to secure or cement abutting meat surfaces together. This application is a continuation-in-part of my prior application Serial No. 844,874, filed October 7, 1959, now abandoned.

If a piece of whole, unground meat, such as a primal cut that has been boned (e.g. a whole ham, shoulder, loin, etc.), or a chunk of meat, weighing at least about a half a pound and having the texture of a primal cut, is mechanically worked long and hard enough it will become noticeably soft, plastic or pliable, and a creamy, tacky exudate appears on the surface of the primal cuts or chunks. It has been found, according to this invention, that this exudate serves as a natural cementitious material for securing opposing surfaces of meat together so that the surfaces do not later separate or come apart during subsequent handling or processing. When properly carried out the exudate is not visually noticeable on the finished product.

The invention can be put to numerous uses as will be brought out in detail hereinafter. However, by way of three preliminary illustrations, by suitably processing a batch of chunks of whole, unground, uncooked meat in accordance with the present invention, it is possible to unite those chunks into a solid, integral body of meat of desired shape in which the chunks do not come apart, and which on slicing has a texture the same as, or similar to, a primal cut. Instead of using chunks, primal cuts of meat may be united in the same way. For example, it is customary to take two pork loins and combine them in a casing to form Canadian bacon. Sometimes stitching or gelatin has been used in an effort to secure the two loins together but invariably separation occurs on slicing. However, by mechanically working the two loins in accordance with the present invention, they may be united by virtue of the surface exudates in a permanent manner so that no separation occurs on slicing or handling. Instead of uniting chunks or primal cuts such as loins, the invention may also be applied to boned primal cuts, having surfaces that can be pressed together shaped into integral bodies of whole meat which do not separate on handling or slicing. For example, a whole boned ham can be mechanically worked in accordance with this invention and then pressed into a form with the result that all portions of the ham unite together in a solid mass or body of meat. Heretofore, it is common knowledge that canned hams have tended to break apart in places on slicing.

This invention is applicable, generally, to whole, unground meats from various animals, including pork, beef, mutton, veal, lamb, venison, etc. The surface uniting of bonding effect is somewhat more noticeable when the meat is cured, but the same effect is obtained with fresh or uncured meat. The full benefit of the bonding action of the exudate formed on mechanical working is obtained upon heat processing or cooking of the meat. However, it is not necessary that the meat be heat processed or cooked immediately after mechanical working. For example, the worked meat may be held under refrigeration for a day or two, or if frozen, it may be held for long periods of time, e.g. several months, before being cooked or heat processed.

The invention is not applicable to pieces or chunks of meat weighing less than about one-half pound and thus does not apply to ground, comminuted or chopped meat, even of the coarse variety. By way of illustration, if a lean piece of raw meat is cut into cubes weighing one-half pound each, if these cubes can be bonded together they can then be re-combined in such a way as to form a solid body of meat of desired shape which on cooking will have the same, or substantially the same texture and appearance as the original piece of meat. On the other hand, if the same piece of meat is ground, even coarsely as through a plate having one-half inch openings, the ground meat cannot be re-combined into a united body which will have the texture and appearance of the raw piece of meat that was ground up. As a practical matter, when the present invention is applied to meat in chunk form, the chunks will usually weigh substantially more than a half pound and often as much as three to five pounds.

Mechanical work or energy may be applied to the chunks of whole meat, or primal cuts, or combinations of chunks and primal cuts in a variety of ways including mechanical mixing, tumbling, churning, pounding, impacting, squeezing, stuffing, etc. Within certain limits, the mechanical working which is required to render the pieces of meat soft and pliable and develop the creamy, tacky exudate on the surfaces, is a time-intensity of working relationship. In other words, if the mechanical working or energy is applied too slowly or gently, the desired condition will not be obtained even after prolonged periods. On the other hand, if the working is too intense then the texture of the whole meat may be broken down or altered to an undesirable degree and an excess amount of exudate will form which shows up as a batter in the finished product and is considered undesirable. However, there is a wide variety of time-intensity of working conditions where good results can be obtained so that the selection of the desirable conditions does not pose a problem in practice. It has been discovered that effectiveness of the mechanical working is enhanced by chilling the pieces of meat below freezing to as low as 25° F. prior to working Normally when primal cuts are processed in accordance with the invention, they will be completely, or at least partly boned out. However, it is not necessary that all of the bone be removed, although if it is not, this may place some limitation on the type of mechanical working that may be used. For example, with bone present, the cuts may not be passed through Moyno pumps or mixed in certain types of rotating vessels with inner mechanisms that might jam on the bones.

While several of the important objects and advantages of the invention have already been mentioned or suggested above, there are a number of others which are not readily apparent from the foregoing introductory discussion but which also are of considerable importance. The main purposes, advantages and objects of the invention may, therefore, be summarized as follows:

(1) Chunks of whole meat may be combined into integral unitary bodies of meat of any desired shape.

(2) Whole primal cuts, e.g. whole hams, can be shaped so as to conform to various containers or forms, and more or less loose or unattached surfaces such as where boning has occurred, may be permanently united, that the resulting body is substantially integral throughout and breakage does not occur during slicing or handling.

(3) Canned products of uniform weights can be obtained with primal cuts by adding one or more mechanically worked chunks to boned mechanically worked primal cuts.

(4) Meat chunks may be used to completely fill containers to predetermined uniform weights.

(5) High pressures are no longer required to fill forms or containers with the mechanically worked pieces (primal cuts or chunks) of meat, thereby simplifying the construction and care of the equipment and facilitating the filling or packing operations.

(6) The removal or internal fat, connective tissue, vascular tissue or other undesirable parts of pieces of meat is made practical thereby yielding more desirable finished products.

(7) Mechanically worked pieces of meat may be readily pumped or conveyed through Moyno pumps and the like and through sausage stuffers into casings or other containers, thereby expediting and mechanizing handling and filling operations to a considerable degree.

(8) Shrinking and cooking losses are substantially reduced.

(9) Larger quantities of meat may be packed into forms or containers of a given size since there will be substantially no voids.

(10) More efficient and complete utilization of all available whole meat muscle or tissue is permitted since chunks from trimmings as well as from primal cuts may be used from which excess fat and undesirable tissues have been removed.

(11) Consumers can realize more efficient and complete usage of purchased meat products since the slices will be uniform in cross section, and will not break or come apart in slicing, allowing more slices to be cut.

(12) Color uniformity can be improved since the mechanical working tends to lighten the color of the meat. For example, it is not unusual to encounter considerable variation in color between certain parts of the same primal cuts, or different cuts. Thus, certain parts of hams are often darker color than others and so-called two-tone hams are not uncommon. By mixing the darker colored chunks or pieces for longer periods than the lighter colored pieces or chunks it is possible to obtain a finished product of more uniform color throughout, or the pieces may be sorted according to color and then combined in that way after mechanical working.

(13) Noticeable tenderizing occurs during the mechanical working and this not only improves products acceptable by present standards but it also makes it practical to up-grade and use heavier primal cuts which have a tendency to be tough and unacceptable at this time. This advantage is of great commercial value.

(14) It is possible to control the cure content more accurately in the case of cured meats. For example, if after regular curing it is found that not enough of the cure has been added, an appreciable amount may still be cured during mechanical working operation. Accordingly, this makes it practical to obtain permissible cure contents as a regular matter of course.

(15) Mechanical working of the pieces of meat makes it possible to eliminate the use of phosphates in certain cures although the combination of phosphate in the cure plus the mechanical working action of cured meat gives optimum results.

(16) Tying of products is eliminated thereby saving labor on the part of the packer and sparing the customer the nuisance and trouble of removing objectionable strings.

(17) Since cook-out losses are reduced, higher cooking temperatures may be employed while obtaining 100% permissible yields with the result that the final products have better bacteriology characteristics.

(18) It is practical to closely simulate from chunks of meat, boneless high quality cuts having complete uniformity, such as pork chops, ham steaks, sirloin steaks, etc.

Certain other objects of the invention will, in part, be obvious and will in part appear hereinafter.

For a more complete understanding of the nature and scope of the invention reference may now be had to the following detailed description thereof under the headings: Processing of Cured Meat Chunks; Processing of Fresh Meat Chunks; and Processing of Primal Cuts.

PROCESSING OF CURED MEAT CHUNKS

The art and science of curing meats have been practiced for untold generations as a means of preserving meat products from one season to another and through adverse conditions from times of plenty to times of need. Basically, meat curing is the process of preserving by the use of salt (i.e. sodium chloride). Many modifications of this basic art are practiced. For example, various sugars may be included in the curing solutions to produce a desirable end product. Sodium nitrite and/or sodium nitrate may be used to produce a pink color in the cured product. In recent years in this country, alkaline phosphates have become permissible and useful curing ingredients. With respect to these and other curing agents, the methods of distributing the same throughout the meat are varied. The curing ingredients, which are usually combined or made up into a so-called "cure mix" or "curing composition" may be added or applied dry to the surface of meat and permitted to penetrate by dissolution and diffusion. Rubbing hastens this process. The curing composition may be dissolved in water and the meat placed therein and permitted to cure in this manner. In addition to these older methods, more recently methods have been devised for distributing the curing solutions through the vascular system or spraying the solution into the tissues with hollow needles. Depending upon the particular technique used to apply or introduce the curing composition, the length of cure may vary from as much as 90 days in the case of absorption cures to a matter of minutes in the case of injected cures.

Some cured meats after subsequent processing are acceptable to the trade as primal cuts without forming or shaping. For example, smoked hams, picnics, corned beef, bacon, etc. may be sold in the form of processed primal cuts. Other products such as cooked hams (boiled ham), canned hams, various beef cuts, casing hams, etc. are formed in molds, cans or casings after curing and boning. Heretofore, in order to form a meat product and have it assume the shape of the form or container it has been necessary to maintain substantial pressures on the product during processing. Because of lack of uniformity within the primal cuts, the pressure applied is not uniformly distributed and consequently the finished product will not always (in face seldom does) completely fill and assume the shape of the form or container. Usually, some parts of the processed product will fall apart on slicing if the lean surfaces have not been firmly pressed together.

For example, a ham is very thin on the shank end, thick in the middle, and medium thick on the butt end. The usual method for cooking a ham is to fold the shank into the bone cavity and cook the product in a form under pressure. A common fault of cooked hams produced in this manner is that the shank or butt pieces break loose on slicing, causing a lesser yield. The product in many cases does not completely follow or fill the form cavity with the result that the slices are non-uniform. Another example that may be cited is Canadian bacon. In making this product, two cured strip loins may be held together by stitching or using a casing during processing. The finished product many times does not hold together well and the product has a tendency to break apart on slicing or on frying.

The methods provided by the present invention serve largely to eliminate the above mentioned and other difficulties experienced in forming cured meat products. Primal cuts of meat and/or trimmings may be cut into suitably sized chunks, either before or after curing, and then processed in accordance with the present invention.

Any of the known and suitable curing compositions may be used, and preferably they should contain a source of phosphate ions. Desirably the maximum permissible amount of alkaline phosphate is used in the cure composition. A typical and suitable source of phosphate ions is sodium tri-poly phosphate. Other alkaline phosphate materials that may be used include, sodium pyrophosphate and sodium hexametaphosphate. The term "chunks" as used herein refers to pieces of whole muscle meat which may be obtained either from primal cuts or from trimmings free from excess fat. Desirably, the chunks may range from about ½ to about 3 pounds or more in weight. While somewhat smaller pieces may be used, the desirable whole meat texture tends to be interfered with. If the chunks are too large, they are not readily packable into conventional containers and do not lend themselves to obtaining the full advantages of the invention. Obviously, the size of the chunks selected is somewhat dependent on the type and size of the processing form used and the traditional appearance required of the finished product. For example, when larger forms or containers are used, larger chunks may be acceptable. It will be appreciated that either mixtures of chunks of various sizes may be used or, the chunks may be of uniform size and weight.

The term or expression "container" or "container means" is used herein to designate any one of the various types and forms of containers that may be selected for receiving the chunks of cured whole muscle meat for heat processing in accordance with this invention. For example, the containers may be tin cans which are sometimes referred to as "rigid metal containers." They may be sausage casings, either natural casings or synthetic casings. The containers or container means may also take the form of so-called "forms" or "cooking forms" such as have been widely used by the meat industry in the production of cooked hams.

The present invention is generally applicable or useful in connection with various types of meat or sources of meat, e.g. pork, beef, veal, mutton, lamb, venison, etc. However, for practical purposes, the main commercial types of meat that will be used in this country are pork, beef, veal, and lamb and the invention will be illustrated in connection therewith. When the meat is pork, the cured forms are generally referred to as ham, including various types thereof.

In practicing this invention, the meat may be cured either while still in the form of primal cuts, or it may be cured after the primal cuts and/or trimmings have been suitably chunked. Excess outer fat and undesirable internal fat, connective tissue, vascular tissue and other undesirable parts of the meats may be removed before or after curing. The method of curing may be any one of the above mentioned known methods.

It was discovered according to the present invention that a tendency to cling and bond together on heating can be imparted to chunks of cured meat by subjecting chunks of cured whole meat to mechanical working so that the chunks become soft and pliable and the surfaces become tacky by reason of the appearance thereon of a creamy, tacky exudate.

It was further discovered that such tendency could be enhanced by (1) curing the meat with cure composition applying phosphate ions or (2) by chilling the chunks of cured meat below the freezing to a temperature as low as 25° F. and to a semi-frozen condition before working. By including a source of phosphate ions in the cure composition and also chilling below freezing prior to working, the tendency of the meat chunks to cling and join together on heat processing is increased to the maximum degree.

The working action may be accomplished in several ways. For example, the chunks of cured meat may be put into a meat mixer of known type such as a Buffalo Mixer, and the resultant agitation therein will produce a multitude of impacts and rubbing between, and flexing of, the chunks with the result that the temperature thereof rises measurably and the chunks become soft and pliable and a tacky and slippery exudate develops on their surfaces. Alternately, the chunks of cured meat may be introduced into a tumbling type of mixer, such as a commercial butter churn, preferably provided with baffles or flights on the side walls as in a concrete mixer so that as the shell rotates the chunks of meat are repeatedly lifted up and then fall as they slide off the baffles or flights, with the result that a multitude of impacts between chunks is obtained, and rubbing and flexing actions are also imparted. Mechanical working of the chunks may also be accomplished in whole, or in part, in devices such as Moyno pumps.

The length of time required to impart the desired softness, pliability and tackiness to the cured meat chunks will in part, depend upon the rate at which energy is imparted to the chunks during working. In other words, the more intense the mixing, tumbling, squeezing or other form of mechanical working, the shorter will be the time required, within limits. The mechanical working results in a rise in temperature of the cured meat and this may be used as an indication of the degree of mechanical working. However, the exact degree of mechanical working is not highly critical and simple observation provides a sufficient guide as to when the chunks have become sufficiently pliable, soft and tacky.

If desired, the chunks of meat may be cured during mechanical working. For example, the uncured chunks of meat may be introduced into the mixer or tumbler along with a curing solution containing a source of phosphate ions and the chunks allowed to cure during mixing. This technique will require additional time to permit penetration of the curing agents, particularly when the chunks are large. However, if after the regular curing procedure, it is found that the permissible cure weight has not been obtained, the balance can be readily incorporated during mechanical working.

One highly successful method of handling cured chunks of meat and mechanically working the same comprises chilling the chunks of cured meat in a blast freezer to about 25° F. The chilled product is then placed in a mixer and mixed until the temperature of the chunks rises approximately 10° F., i.e. to about 35° F., due to mixing. The mixing is discontinued when the chunks become soft and pliable and the surfaces tacky and slippery. Obviously, considerable working energy has been consumed in supplying the heat required to change the meat from a semi-rigid, partially frozen condition to a soft, pliable condition. When the cured meat before working has an initial temperature of 40° F. a substantially larger rise in temperature occurs by the time the pieces of meat have been brought to the proper condition of softness, pliability and tackiness at the surface, than when the initial temperature is below freezing. For example, a temperature rise of from 40° F. to 65° F. occurs, an increase of 25° F. versus a rise of 10° F. when the meat was pre-chilled to 25° F.

After the cured chunks of whole meat have been subjected to the mechanical working step and properly conditioned, they are packed in any suitable manner, either by hand or machine, into containers for heat processing. The filled containers or forms are then promptly heat processed or pasteurized in known manner, whereupon the adjoining interfaces of chunks of meat become firmly united so that the contents of each container or form become in effect a single integral meat body conforming to the shape of the interior or container cavity.

The mechanical working also imparts a slipperiness to the surfaces of the meat chunks so that they may be readily pumped in sausage stuffing equipment and this stuffed into casings or introduced into other containers such as pullman type ham cans and cooked ham forms. The ability to so handle or pump the chunks of meat considerably reduces the manual labor required for stuffing and filling operations.

The mixing of the chunks of meat in accordance with this invention so as to mechanically work the same may be accomplished in small batches of 100 pounds or in large batches of the order of 1000 pounds or more. While there is considerable variation in meat composition from animal to animal and within each primal cut itself, the mixing and subsequent reforming of the chunks or pieces of meat in the larger batches allows these variations to be somewhat neutralized or averaged out. Therefore, the color, texture and fat distribution in the shaped meat products are quite uniform in comparison to the formed or shaped meat prepared in the usual way.

As mentioned, cured meat products prepared with chunks rather than primal cuts, and with chunks that have been mechanically worked, result in a higher yielding product. This is particularly true when the cure composition contains a source of phosphate ions. That is, the processing shrinks are significantly reduced when compared to the usual method of handling the primal cuts. In the case of canned hams, for example, made in accordance with this invention from chunks of meat cured in the presence of phosphate ions, the cooking loss is about 3-4% compared to about 8% for hams prepared in the usual way. If in addition, the hams are chilled prior to the mechanical working, the cookout or shrink loss is only from 1-2%.

The following specific examples will serve further to illustrate the invention and to suggest other examples to those skilled in the art.

Example 1

Fresh pork hams were trimmed reasonably free of skin and heavy fat on the outside. A curing composition comprising a solution containing 15 parts sodium chloride, 2 parts sugar, 5 parts sodium tripolyphosphate, 0.1 part sodium nitrate and 0.1 part nitrite was prepared by dissolving these cure ingredients in 77.8 parts water. The resulting curing solution was pumped through the vascular system of the hams using a hollow needle inserted in the femoral artery with sufficient curing solution being introduced to produce approximately a 10% increase in weight of each ham.

The pumped hams were held in a cooler for five days at approximately 38° F. during which time they were kept covered with additional quantities of the above curing solution. At the end of five days the hams had the proper cure flavor and appearance and were removed from the cooler, washed to remove excess curing ingredients on the surface, and then cut into angular chunks weighing from about ½ to about 3 pounds each. The chunks were cut generally with or parallel to the grain insofar as conveniently practical instead of in a crosswise direction. During the course of chunking, excess fat and undesirable tissues were removed from the meat.

The lean chunks of cured meat were placed in a meat mixer of known type holding approximately 500 pounds with the temperature of the meat at loading being approximately 40° F. The mixer was started and after about 2 minutes mixing it was noted that a slight amount of tacky material appeared at or was formed on the surface of the chunks of meat. At the end of ten minutes of mixing the temperature of the meat had risen to about 65° F. and a considerable amount of a very sticky material had coated each chunk of meat. The chunks were also in a soft and pliable condition at this point.

The chunks of meat were removed from the mixer and packed in conventional pear-shaped tin cans holding 7 pounds each. The filled cans were then closed and heat processed or pasteurized in the usual manner by putting the same in hot water at 165° F. and leaving them therein until the internal temperature of the meat reached 152° F.

After cooling the cans were opened and it was found that the chunks of meat had become firmly bonded together in an integral mass of whole meat which completely filled the container without voids. The bodies of meat could be sliced without breaking or falling apart. The texture of the slices was lean and uniform.

Example 2

Miscellaneous trimmings that were produced incidental to the preparation of primal cuts of pork on the cutting floor were used in this example. Such trimmings from hams, shoulders, bellies and loins were trimmed so as to be reasonably free of fat and skin and then reduced to angular chunks weighing from about ½ to about 3 pounds each. Undesirable tissues as well as excess fat was removed during the chunking operation. The chunks were then introduced into 50 gallon containers with sufficient curing solution so as to cover the chunks. The curing solution was prepared by dissolving 15 parts sodium chloride, 2 parts sugar, 5 parts sodium pyrophosphate, 0.1 part sodium nitrate and 0.1 part sodium nitrite in 77.8 parts of water. The chunks were allowed to cure in this solution for seven days during which time the curing salts became absorbed and distributed in the meat with the development of suitable flavor and appearance. At the end of this curing time the chunks were removed and drained free of the curing solution and then washed so as to remove excess of the curing salts from surfaces. The chunks were then spread out on pans and chilled in a freezer until they reached the temperature of about 25° F. The frozen meat chunks were then removed from the freezer and placed in a meat mixer. The mixer was placed in operation and the mixing continued until the temperature of the chunks reached a temperature of about 35° F. This took approximately 8 minutes. As this temperature was approached the chunks became increasingly soft and pliable with increased quantities of a tacky material appearing on the surface.

The chunks were then removed from the mixer in this condition and packed into spring-loaded forms of known type. The forms were closed and then processed in hot water at 165° F. in the usual way until the temperature on the interior of the forms reached 152° F. The form cavities were completely filled in each instance and upon cooling and removal it was seen that there were no cavities in the finished shaped bodies of meat. The bodies of meat were completely integral throughout and could be sliced at any desired thickness without separation or breaking into pieces. The slices had practically the same appearance and texture at different locations in the shaped body. If a form is used having a cross-section corresponding in shape and size to center slices of ham, then the resulting product on removal can be smoked and then uniformly sliced into simulated center slices which may be individually packaged in a transparent wrapper. In the same manner other shapes and sizes may be produced.

Example 3

The chunks of meat for this example were prepared, cured and mixed as in Example 2 and then introduced into a conventional piston type sausage stuffer. The meat was stuffed into fibrous casings, tin cans, and spring-loaded forms. In each instance the containers and contents were introduced into hot water baths at 165° F. and maintained therein until temperatures thereof rose to 152 F. In all cases the products formed integral, solid blocks or loaves of meat which were easily sliceable without breaking or falling apart.

Example 4

In this example the meat was beef. Commercial beef ham sets were used since they require less trimming. Such beef ham sets were pumped to about 20% of their weight with a curing solution of the following composition: sodium chloride 15 parts, sugar 2 parts, sodium tripolyphosphate 2.5 parts, sodium nitrate 0.1 part, sodium nitrite 0.1 part and appropriate spice oils and extractives in 79.5 parts of water. The pumped beef ham sets were cured for five days in a cooler while submerged in additional quantities of curing solution. At the end of five days the beef ham sets were washed with water to remove excess curing ingredients on the surface and then cut into angular chunks weighing between ½ to 3 pounds each. Excess fat and undesirable tissues were removed from the chunks at this time.

The chunks were then spread onto pans and chilled in a freezer to 25° F. The chilled chunks were then introduced into a meat mixer and mixed therein until the temperature of the chunks rose to 35° F. The chunks developed a tacky coating at the surface and became soft and pliable. In this connection the chunks were hand packed into cans, casings and spring-loaded forms and processed therein in hot water at 165° F. until the contents reached internal temperatures of 152° F. In each instance, the chunks of cured beef readily consolidated into a substantially or solid body or loaf of meat. These bodies or loaves of cured beef were readily sliceable without breaking or falling apart and the texture thereof appeared to be that of whole beef of lean texture and free of excess fat.

Example 5

Beef trimmings were cut into angular chunks weighing from about ½ to 3 pounds each with excess fat and connective tissue being removed therefrom. Such chunks were then introduced into containers and covered with curing solution of the composition set forth in Example 4 above. The chunks were allowed to cure by absorption until they developed the desired flavor and appearance, taking 10 days. Thereupon, the chunks were removed from the curing solutions and washed. The cured and washed chunks of beef were then introduced into a meat mixer at the temperature of 40° F. and were mixed therein for about ten minutes during which time the temperature rose to about 65° F. As a result of this mixing the chunks became soft and pliable and a tacky coating exuded on the surfaces thereof. In this condition, the mixed chunks were placed in a conventional piston type sausage stuffer and used to stuff pullman ham cans, casings and spring-loaded forms. These containers were then heat processed or pasteurized in a water bath at 165° F. so as to raise the internal temperature of the contents to approximately 152° F. The resulting shaped bodies and loaves had the same excellent slicing properties and whole meat texture as in Example 4 above.

Example 6

Primal cuts of pork in the form of hams and shoulders were pumped with a curing solution containing 15% sodium chloride and 5% sodium tripolyphosphate. The curing solution was distributed through the vascular system using a hollow needle. After pumping the primal cuts were held in a cooler for three days, removed and washed with water. The cured primal cuts were boned, trimmed of undesirable fat and cut into angular chunks of ½ to 3 pounds each. The chunks were chilled in a freezer to a temperature of about 25° F. The chilled chunks were then mixed in a meat mixer until their temperature rose back to approximately 35° F. By this time the chunks had become soft and pliable and a tacky substance had exuded to the surface and coated the chunks. In this condition the chunks were packed directly by hand into cans, forms and casings. In these containers the products were heated in a conventional smokehouse at 160° F. for about 10 hours so as to give the products a roasted or baked characteristic. In each instance the chunks became fused together at the interfaces into a solid continuous product conforming to the interior shape of the container. The products were readily sliceable without breaking or separation into uniform slices.

Example 7

This example corresponds in all respects to Example 1 above except that the sodium tripolyphosphate was omitted from the curing composition so that there was no source of phosphate ions in this substance. Upon mixing the cured chunks in the meat mixer they became soft and pliable and a tackiness developed on the surfaces thereof. However, the tackiness and the coating on the surfaces was not as pronounced as in the case of Example 1. The mixed chunks were packed directly into tin can containers and after heat processing the resulting product could be sliced without falling apart or crumbling into pieces.

A small ham chunk, weighing about one pound, which is pear shaped and packaged on a lid with a transparent over-wrap would be a desirable item for the self-service meat counter trade. If miscellaneous cured ham chunks are mixed and stuffed into a long form having a pear-shaped cross-section, an acceptable finished product can be made in accordance with this invention. The cooked shaped product can be cut into uniform weight pieces and hermetically packaged as taught in Patent 2,787,552.

Canadian or back bacon is made from a selected muscle in a pork loin. The present product varies in size with the weight of the animal. It is therefore difficult to package because of lack of uniformity in size and weight. If the same selected muscles are cut into chunks and mixed, it is then possible to extrude the chunks into a form of the desired dimension in which it may be processed as described above. The finished packaged product is uniform in size, cross-section, and weight thereby giving a decided advantage over the conventional method of manufacture.

Pork shoulder butts or smoked butt, is a tasty and well known meat product. There is considerable customer resistance to it however because of its excess fat content, lack of uniformity and heavy weight. An improved smoked butt can be made from heavy butts by removing a portion of the fat, cutting in chunks, and mechanically mixing. The mixed product can be extruded into casings of any desired size and length. A highly acceptable product is thus produced, the weight and diameter of which can be controlled. The product is also uniform in composition and it does not "split" on heating or baking.

There is a market for a sliced canned ham steak. At the present time, this product is extremely difficult to slice into pieces of uniform diameter and thickness. Anyone familiar with the muscle structure of a ham will appreciate the difficulty of cutting a ham into uniform diameter strips that can be subsequently sliced. This method of preparation is at best extremely wasteful and laborious. However, by chunking cured ham followed by mixing and extruding into casings these problems can readily be overcome.

As mentioned above, cured meat products prepared with chunks rather than with primal cuts and with chunks that have been mechanically worked result in a higher yielding product. That is, the processing shrinks are significantly reduced when compared to the usual method of handling the primal cuts. In the case of canned hams made from chunks of meat, the cooking loss is about 3-4% compared to 8% for hams prepared in the usual way. If in addition the ham is chilled and mechanically worked or mixed, the cookout is only 1-2%. By way of specific comparative data, baked boneless hams formed in a wire grid and processed after chunking showed a cook shrink of 27.3%, while in a parallel test in which the chunks were mixed the cook shrink was 20.62% in one instance and 16.9% in another. A boneless cooked ham in loaf form was chunked and processed with a cook shrink of 11.59%, while the same product in which the chunks were mixed showed a cook shrink of 6.1%. Cured ham chunks processed in a casing showed a cook loss of 25.1%, compared to 16.8%, 11.7%, 12.7% and 13.4% for the same product when subjected to mixing. In still another test a cooked ham in loaf form showed a cook shrink of 4.43% when the chunks were mixed.

In the foregoing examples, sodium tripolyphosphate, sodium pyrophosphate and sodium hexametaphosphate are interchangeable in corresponding amounts, or if desired, mixtures may be used. Furthermore, the potassium salts may be used, if desired, in place of the sodium salts.

As mentioned, excess fats should be removed from the chunks before they are mechanically worked according to this invention. It is not necessary, however, that practically all of the fat be removed from the surfaces of the chunks since local fat deposits are readily encapsulated in the unified piece of meat which is formed as a result of the process. As is known, there are certain types of meat products in which fat is desirable and as a matter of fact, the presence of some fat serves to characterize the products. There is no difficulty in producing such products in accordance with this invention. On the other hand, if the chunks of meat are largely covered with fat with only small areas of lean or muscle tissue exposed, then the results will be poor and unsatisfactory.

PROCESSING OF FRESH MEAT CHUNKS

Fresh meat is considered to be a product resulting from a recently slaughtered animal, usually chilled under normal operating conditions with no commonly used curing agents having been used to treat the meat. It was determined by experiment that a creamy, tacky exudate could be formed on the surfaces of chunks of fresh meat just as it was formed on surfaces of chunks of cured meat. The addition of ordinary salt and/or alkaline polyphosphates was found to hasten the formation of the tacky exudate and increase the amount formed. Salt additions of ordinary salt (NaCl) and/or alkaline polyphosphates such as sodium tripolyphosphate, sodium pyrophosphate and sodium hexametaphosphate up to 2% by weight of the meat were found to be satisfactory. By the time the fresh meat chunks develop the creamy tacky exudate on their surfaces they will have the same soft, pliable, rubbery and plastic character as the chunks of cured meat. In like manner, the mechanically worked chunks of fresh meat can be pumped or stuffed into rigid or semi rigid forms or containers. It was found advantageous to freeze the meat in the forms for one or two days so as to facilitate subsequent handling. After removing from the forms the meat could be cut into slices or pieces of the desired thickness for further packaging. It is significant that the thus prepared meat retains the shape of the form even after defrosting. Furthermore, upon frying, baking, boiling and grilling the meat thus formed was found to retain its shape and the slices remained intact without separation. Apparently, the exudate that had originally formed on the surfaces of the individual chunks or pieces, coagulated and bonded the meat into a unified mass.

The following examples will serve to further illustrate the invention as applied to fresh chunked meat:

Example 8

Boneless pork derived from fresh hams was cut into chunks weighing from one to three pounds. Salt at the 2% by weight level was distributed over the chunks and they were mixed in a meat mixer about 6 minutes until each chunk was covered with a creamy tacky exudate or coating, with the chunks being soft, pliable or plastic. The mechanically worked meat was then stuffed into 5½ inch diameter fibrous casings and permitted to freeze for 48 hours. The casings were removed and the product was sliced, with slices being stacked four high on a circular self-service lid over-wrapped with transparent wrapping material. Part of the samples were permitted to defrost before being prepared for eating while the remainder were prepared from the frozen condition. It was found that the defrosted samples could be handled in a normal way without the slices separating into individual pieces along the line of the chunks. It was also found that the meat retained its shaped appearance on frying and that it was necessary to use a knife to cut the meat in bite size pieces. When the frozen samples were fried directly, they also exhibited the same characteristics.

The same product has been made by using 0.5% sodium tripolyphosphate in place of the 2% sodium chloride.

Example 9

Example 8 was repeated but boneless beef was used and the resulting product exhibited the same characteristics as the product of Example 8.

Example 10

Example 8 was repeated using fresh boneless veal with the same results.

Example 11

Boneless fresh mutton was handled in the same manner as described in Example 8 and the resulting product exhibited the same characteristics as the product of Example 8.

Example 12

Mixtures of fresh pork, beef and veal chunks were processed in the same manner as described in Example 8 and the composite product exhibited the same characteristics as the product of Example 8.

Example 13

A stainless steel form 30 inches in length and having a cross section corresponding in size and shape to that of a loin pork chop, was constructed. Chunked fresh pork was prepared according to Example 8 and stuffed into this form and processed as described in Example 8. The removed frozen product was sliced into one-half inch thick slices and these chops were individually packaged. The resulting product here resembled a fresh pork chop in appearance and on handling or cooking exhibited the same characteristics as in Example 8.

Example 14

Another fresh pork product was prepared following Examples 8 and 13 but this time when the frozen body was removed from the form it was cut into three pieces each about 10 inches long. Each of these pieces resembled a pork loin roast. They were prepared for eating in the same way as a natural bone-in-pork loin roast and the product held together on baking after which it was cut into uniform slices without separation.

Example 15

Fresh pork loins weighing 25 pounds and up were boned and trimmed the same as Canadian loins for the self-service market, all exposed fat and heavy seam fat being removed so that the trimmed loins did not contain over 10% fat. The 95% muscle chunk trimmings obtained from trimming the pork loins can be used in the product. The boned lean loins were cut lengthwise into two equal parts, then cut crosswise at the center of the loin dividing it into four equal parts which weighed 1¾ pounds to 2¼ pounds per chunk. The lean loin chunks were mixed in a Day Mixer or a stainless steel meat mixer with 0.8% salt until the meat became tacky and plastic. It was then removed from the mixer and stuffed into No. 2½ fibrous casings 36 inches long by means of a piston-type air pressure stuffer an a 2 inch by 17 inch stainless steel pipe as a stuffing horn. The stuffed product was placed in blast freezer or cooler and chilled to 15° F. internal temperature and then transferred to a 18–20° F. tempering room and held for a total chill time of 48 hours. The product was removed and sliced. The sliced product was fried in deep fat and canned according to known commercial procedure. On opening the cans the individual slices could be cut cold or hot and each held together without separation or breaking apart.

*Example 16*

Fresh hams weighing from 25 to 30 pounds were boned and trimmed so as to be 90% lean and so that at no point sliced would have surface or exposed seam fat in excess of ¼ inch. The boned, lean hams were cut into strips cut lengthwise with the muscle fibers to a diameter not exceeding about 3½ inches and a minimum weight of 1¾ pounds and a maximum weight of about 2¼ pounds. The lean ham strips or chunks were then processed in the same way as was the lean loin chunks in Example 15.

PROCESSING OF PRIMAL CUTS

While the processing of whole tissue meat in the form of chunks as described above offers many advantages and a high degree of flexibility both with respect to the utilization of available meat and the production of a wide variety of products, the invention may also be used to advantage in processing whole primal cuts, or so-called "cut down" primal cuts without reducing them to chunk form. The following examples will serve to illustrate this aspect of the invention:

*Example 17*

Good quality fresh, green, skinned hams are used. Hams with slight skin mutilations may be used as well as mis-cut and broken bone hams provided a quality boneless product can be produced. The hams are skinned and defatted so as to leave a uniform surface fat level not exceeding ⅜ inch. Excess fat over the aitch bone is trimmed and the artery may be removed. The corner of the butt and cushion are defatted between 2½ and 3 inches exposing lean meat for about 4 inches across the triangle. The fat is beveled to the lean at the butt at about a 30° angle. All surplus fat is removed from the cushion side of the ham but the fat covering the stifle joint is not disturbed as this is needed to cover the cavity of the boned hams. Glands and excessive flank fat are removed and the cushion pocket is defatted.

After skinning and defatting the hams are green boned. The bone is chiseled to remove bones in a manner to keep knife cuts to a minimum. The hams are slashed open by opening the natural seam joining the face and cushion of the ham and exposed shank tendons are removed. The hams are now ready for curing and they may be pumped by one pass through the regular pumping machines, fat side down, adding 8% by weight of pumping pickle of a composition commonly used for canned hams. After pumping the hams are packed in stainless steel boxes and covered with polyethylene film and allowed to cure 12 to 72 hours at 38 to 42° F. The hams are then given a second pass through the pumping machines fat side down, this time also adding 8% by weight of pumping pickle so that the final cure yield will be about 113 to 114% of the green defatted, boned weight. The hams are again packed in stainless steel boxes, covered with polyethylene film and allowed to cure 2 to 5 days at 38 to 42° F. The hams are now ready for mechanical mixing.

The cured hams are placed in a stainless steel churn of a known commercial type used in the dairy industry for churning cream to butter. Such a churn may be approximately 9 feet long and 5 feet in diameter and arranged to rotate on its horizontal axis at approximately 12½ r.p.m. The hams loaded into the churn should be uniform in style and weight. A churn of the above size will hold up to 2500 pounds of these cured hams. During mixing the hams should increase in temperature at least 4° F. so as to have a temperature of from 46 to 50° F. At the speed mentioned the mixing varies somewhat with the load in the churn but with a full load will require approximately 20 minutes.

The hams should be canned within about four hours after the mixing is finished, while the surfaces are covered with a copious amount of the creamy tacky exudate. The whole hams are placed in the cans with the fat side down. The shank of each ham is folded in a manner so that it will be at the small end of the pear-shaped can so as to meet the body of the ham. The ham is closed so that the slashed edges meet. The butt is folded to the body of the ham. The aitch bone cavity of the ham must be parallel to the large end of the can after being thus placed in the cans, each ham is pressed in known manner, e.g. in a Griffith hydraulic press, for approximately one second using a minimum of 200 p.s.i.g. The cover is then placed on the can and the cans are put in the closing machines and closed under a minimum of 25 inches of vacuum. The canned hams are now ready for cooking and chilling. The cans are placed, wide end down, in a rectangular cook basket with the cans being arranged so that complete circulation of water around each can is possible during cooking.

After cooking is complete the hams are chilled a minimum of 2 hours with cool or cold (e.g. 60 to 70° F.) circulating water. The hams must be chilled below 90° F. internally. Thereafter chilling is continued in a blast chill room of 30 to 40° F. holding cooler so that the hams will be chilled to 40° F. in 48 hours or less. However, no portion of any of the hams should be frozen. The hams after thus chilling are then stored in a 32 to 35° F. cooler for at least 30 days after processing before releasing for sale.

Boneless primal cuts of fresh meat may be processed according to the invention. For example, fresh pork primal cuts (hams, picnics and loins) or fresh beef primal cuts from lower grades of animals may be processed into acceptable products.

*Example 18*

Boneless heavy hams weighing about 18 pounds are churned in the presence of 2% salt until they become soft and pliable, and covered with a tacky exudate. The hams are then stuffed into casings or rigid forms. The stuffed or shaped products are frozen and subsequently sliced into serving portions. On frying or other form of cooking, the tacky exudate binds the cut surfaces of the meat into a continuous surface. The shaped hams may also be processed in the container to an internal temperature of 172° F. to produce a baked or roasted product. Whole fresh loins and pork shoulders may be processed in a similar manner.

*Example 19*

Beef strip loins of low grade animals can be processed into acceptable products using the procedures described in Example 18.

Since, in addition to the embodiments set forth above, the invention may be practiced in a number of different ways without departing from the spirit and scope thereof, the foregoing description and embodiments are intended to be interpreted as illustrative and not in a limiting sense.

What is claimed as new is:

1. In the process of a primal cut of meat weighing at least one-half pound and having surfaces that can be pressed together to form a more compact body of meat the improvement which comprises, mechanically working the whole, unground, uncooked primal cut until it becomes soft and pliable and an appreciable amount of tacky exudate forms on its surfaces, and pressing together surfaces covered with said exudate to form a more compact body of meat.

2. The method of claim 1 wherein said primal cut is first chilled to about 25° F. prior to said working.

3. The method of claim 1 wherein said primal cut prior to said working is first cured with a curing composition containing phosphate ions.

4. The method of claim 3 wherein an additional quantity of said curing composition is added during said working.

5. The method of claim 1 wherein the resulting pressed product is heat processed so as to set the tacky exudate bonds between pressed surfaces.

6. The method of claim 1 wherein said primal cut is fresh meat and said resulting pressed product is frozen solid and stored in the frozen condition.

7. The method of forming larger bodies of whole meat having a texture similar to that of a primal cut, which comprises mechanically working chunks or primal cuts of whole, unground, uncooked meat weighing at least one-half pound each until they become soft and pliable and an appreciable amount of tacky exudate forms on the surfaces of the meat, and pressing a plurality of said chunks or primal cuts together in said mechanically worked condition.

8. The method of claim 7 wherein said chunks are first chilled to about 25° F. prior to said working.

9. The method of claim 7 wherein said chunks are first cured with a curing composition containing phosphate ions prior to said working.

10. The method of claim 9 wherein an additional quantity of said curing composition is added during said working.

11. The method of claim 7 wherein the resulting pressed product is heat processed so as to set the tacky exudate bonds between pressed surfaces.

12. The method of claim 7 wherein said chunks are formed of fresh meat and said resulting pressed product is frozen solid and stored in the frozen condition.

13. The method of forming larger bodies of whole meat having a texture similar to that of a primal cut, which comprises mechanically working chunks or primal cuts of whole, unground and uncooked meat weighing at least about one-half pound each until they become soft and pliable and an appreciable amount of tacky exudate forms on the surfaces of the meat, and extruding a plurality of said chunks or primal cuts in said mechanically worked condition into container means.

References Cited in the file of this patent

UNITED STATES PATENTS

| | | |
|---|---|---|
| 2,182,891 | Eikel | Dec. 12, 1939 |
| 2,305,480 | Komarik | Dec. 15, 1942 |
| 2,596,067 | Brissey | May 6, 1952 |
| 2,812,261 | Wasserman | Nov. 5, 1957 |
| 2,824,809 | Schoch | Feb. 25, 1958 |
| 2,888,351 | Olson et al. | May 26, 1959 |
| 2,903,366 | Barnett | Sept. 8, 1959 |